United States Patent
Parchani et al.

(12) 
(10) Patent No.: US 12,380,313 B2
(45) Date of Patent: Aug. 5, 2025

(54) SYSTEM AND METHOD FOR EFFICIENTLY IDENTIFYING A SUBJECT

(71) Applicant: Turtle Shell Technologies Private Limited, Bengaluru (IN)

(72) Inventors: Gaurav Parchani, Bangalore (IN); Mudit Dandwate, Nagpur (IN); Vibhor Saran, Lucknow (IN)

(73) Assignee: Turtle Shell Technologies Private Limited, Bengaluru (IN)

( * ) Notice: Subject to any disclaimer, the term of this patent is extended or adjusted under 35 U.S.C. 154(b) by 839 days.

(21) Appl. No.: 17/539,600

(22) Filed: Dec. 1, 2021

(65) Prior Publication Data
US 2023/0026063 A1    Jan. 26, 2023

(30) Foreign Application Priority Data
Jul. 13, 2021 (IN) .............................. 202141031491

(51) Int. Cl.
*G06N 3/04* (2023.01)
(52) U.S. Cl.
CPC ..................... *G06N 3/04* (2013.01)
(58) Field of Classification Search
CPC ........................................................ G06N 3/04
See application file for complete search history.

(56) References Cited

U.S. PATENT DOCUMENTS

| 10,292,625 B2 | 5/2019 | Shinar et al. |
| 2020/0151987 A1 | 5/2020 | Derakhshani |
| 2020/0201971 A1* | 6/2020 | Wei ................. G06N 20/10 |
| 2021/0406590 A1* | 12/2021 | Hu .................. G06N 3/044 |

OTHER PUBLICATIONS

Zhang, Yi, et al., "Unobtrusive and Continuous BCG-Based Human Identification Using a Microbend Fiber Sensor." IEEE Access, vol. 7, May 27, 2019, pp. 72518-72527.

Rubin, et al., "Classifying Heart Sound Recordings using Deep Convolutional Neural Networks and Mel-Frequency Cepstral Coefficients." Computing in Cardioligy Conference (CinC), Sep. 2016. pp. 813-816.

Bozkurt, B., et al. "A study of time-frequency features for CNN-based automatic heart sound classification for pathology detection." Computers in Biology and Medicine, Jun. 24, 2018, pp. 1-43.

* cited by examiner

*Primary Examiner* — Quang N Vo
(74) *Attorney, Agent, or Firm* — Lerner David LLP

(57) ABSTRACT

A system and a method for efficiently identifying a subject is provided. The invention provides for segmenting micro-voltage digital signals into intervals of a pre-defined time period. Further, the invention provides for transforming the segmented micro-voltage digital signals into a frequency domain for computing on a Mel's scale. The Mel's scale provides a unique signature of the subject in the form of a Melspectrogram image. Lastly, the invention provides for passing the Melspectrogram image through a trained deep learning model. The features associated with the Melspectrogram image are extracted into a feature map for obtaining predicted labels associated with the subject based on labels used during training of the deep learning model for identifying the subject.

32 Claims, 13 Drawing Sheets

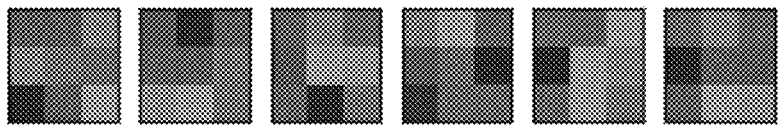
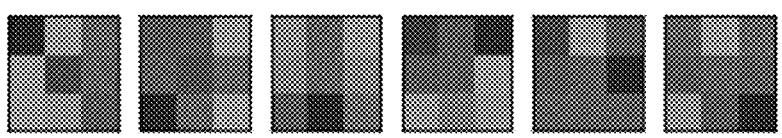
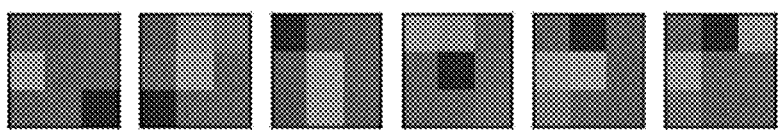
FIG. 5 Filters of the Convolution Layers

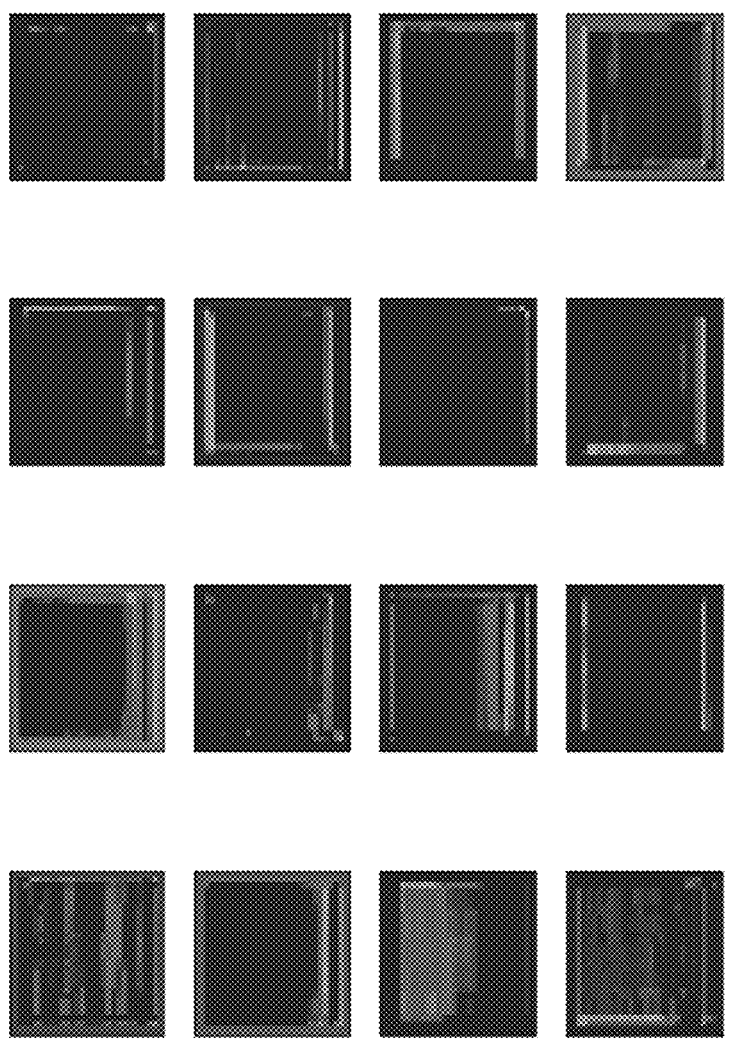
FIG. 6 Feature map of a transformed Melspectrogram image (output) for subject 1

Feature map of a transformed Melspectrogram image (output) for subject 2

SYSTEM AND METHOD FOR EFFICIENTLY IDENTIFYING A SUBJECT

FIELD OF THE INVENTION

The present invention relates generally to the field of subject identification. More particularly, the present invention relates to a system and a method for efficiently identifying a subject based on micro-vibrations generated by the subject's body.

BACKGROUND OF THE INVENTION

Identification of a subject (i.e. a person) accurately for effective contactless health monitoring is essential as it aids in maintaining the subject's health data correctly and adequately. Contactless and non-invasive health monitoring techniques provide capturing health data of a subject without altering the subject's lifestyle or living environment by using a contactless health monitoring device. Further, the use of telemedicine in contactless health monitoring has increased due to worsening of subjects to caregivers ratio and therefore effective and correct health data of a subject is required for monitoring the subject remotely for providing proper treatment.

However, there may be a scenario in which more than one subject is present near the contactless health monitoring device and the health data of an intended subject may not be captured effectively and correctly by the health monitoring device, as the health data of a non-intended subject may also be captured and tagged along with the intended subject's health data. It has been observed that the existing health monitoring techniques and devices capture health data for non-intended subject, who may be in proximity or in place of the intended subject and incorrectly mark the non-intended subject as the intended subject, therefore providing discrepancy in the captured health data.

Further, the health data is used for various purposes such as, tracking a subject's health deterioration, health patterns, heart rate, blood pressure, sleep patterns, maintaining health data and records, compliance to health plans, etc. It has been observed that the existing health monitoring techniques are not able to monitor the subject's health efficiently and are usually invasive. Further, the health data captured by the existing health monitoring techniques are prone to tampering, theft and fraud (e.g. the intended subject may record the health data for some other subject and mark it as its own). Furthermore, authenticating techniques (e.g. video and computer vision, fingerprints, biometrics, etc.) used for determining the identity of the intended subject are usually expensive, difficult to maintain and are not secure. The biometrics data (e.g. fingerprints, retina scans, DNA data, etc.) used in authenticating techniques may be replicated (e.g. fingerprints may easily be taken off from a surface using "gummy fingers") and hence may be used without the subject's knowledge and consent.

In light of the above mentioned drawbacks, there is a need for a system and a method which provides for efficiently identifying a subject. Further, there is a need for a system and a method which provides for correctly capturing health data of the subject. Furthermore, there is a need for a system and a method which provides for non-invasive and secure authentication techniques for identifying the subject.

SUMMARY OF THE INVENTION

In various embodiments of the present invention, a system for efficiently identifying a subject is provided. The system comprising a memory storing program instructions, a processor configured to execute instructions stored in the memory and an identification engine executed by the processor. The identification engine is configured to segment micro-voltage digital signals into intervals of a pre-defined time period. Further, the identification engine is configured to transform the segmented micro-voltage digital signals into a frequency domain for computing on a Mel's scale. The Mel's scale provides a unique signature of the subject in the form of a Melspectrogram image. Lastly, the identification engine is configured to pass the Melspectrogram image through a trained deep learning model. The features associated with the Melspectrogram image are extracted into a feature map for obtaining predicted labels associated with the subject based on labels used during training of the deep learning model for identifying the subject.

In various embodiments of the present invention, a method for efficiently identifying a subject is provided. The method is implemented by a processor executing instructions stored in a memory. The method comprises segmenting micro-voltage digital signals into intervals of a pre-defined time period. Further, the segmented micro-voltage digital signals are transformed into a frequency domain for computing on a Mel's scale. The Mel's scale provides a unique signature of the subject in the form of a Melspectrogram image. Lastly, the Melspectrogram image is passed through a trained deep learning model. The features associated with the Melspectrogram image are extracted into a feature map for obtaining predicted labels associated with the subject based on labels used during training of the deep learning model for identifying the subject.

In various embodiments of the present invention, a computer program product is provided. The computer program product comprises a non-transitory computer-readable medium having computer program code stored thereon, the computer-readable program code comprising instructions that, when executed by a processor, causes the processor to segment micro-voltage digital signals into intervals of a pre-defined time period. The processor further transform the segmented micro-voltage digital signals into a frequency domain for computing on a Mel's scale. The Mel's scale provides a unique signature of the subject in the form of a Melspectrogram image. Lastly, the processor further pass the Melspectrogram image through a trained deep learning model. The features associated with the Melspectrogram image are extracted into a feature map for obtaining predicted labels associated with the subject based on labels used during training of the deep learning model for identifying the subject.

BRIEF DESCRIPTION OF THE ACCOMPANYING DRAWINGS

The present invention is described by way of embodiments illustrated in the accompanying drawings wherein:

FIG. 5 illustrates initial six filters from a first convolutional layer of the deep learning model architecture, in accordance with an embodiment of the present invention;

FIG. 6 illustrates a feature map of a transformed Melspectrogram image associated with a subject 1 after passing through the filters of the convolution layer, in accordance with an embodiment of the present invention;

DETAILED DESCRIPTION OF THE INVENTION

The present invention discloses a system and a method for efficiently identifying a subject (i.e. a person). In particular, the present invention provides for correctly identifying a subject based on micro-vibrations generated by the subject's body. Further, the present invention provides for effective health monitoring and generating health data of the identified subject. Further, the present invention provides for a system and a method for a non-invasive and a double layer secure authentication for identifying the subject. Furthermore, the invention provides for a system and a method for identification of a subject in a cost effective manner.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
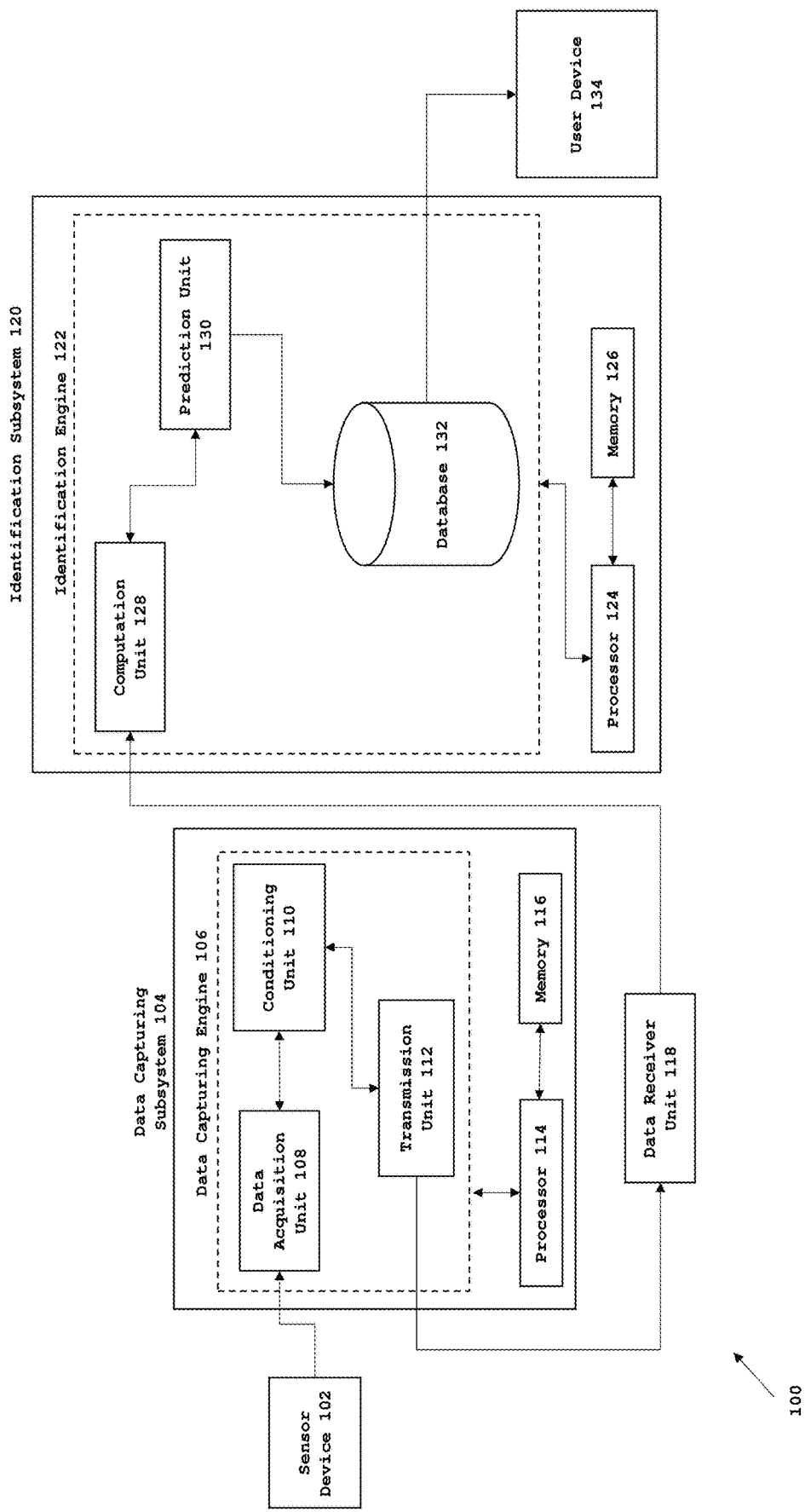
FIG. 1 is a detailed block diagram of a system for efficiently identifying a subject, in accordance with an embodiment of the present invention.

FIG. 1 is a detailed block diagram illustrating a system 100 for efficiently identifying a subject.

In an embodiment of the present invention, the system 100 is configured to capture micro-vibrations generated by a subject's (i.e. a person) body for identifying the said subject. The micro-vibrations are generated due to myoelectric properties of the cardiovascular systems. The micro-vibrations are associated with ballistocardiographic (BCG) signals. The micro-vibrations associated with the BCG signals, generated by the subject's body, are unique in nature and no two subjects have same micro-vibrations. Further, the system 100 operates in a non-contact and non-invasive manner and evolves based on the subject's identity data.

In an embodiment of the present invention, the system 100 comprises a sensor device 102, a data capturing subsystem 104, a data receiver device 118, an identification subsystem 120 and a user device 134.

In an embodiment of the present invention, the sensor device 102 comprises an array of sensors which are placed in a housing at the subject's end. The sensor device 102 is specifically designed for carrying out various embodiments of the present invention. In an exemplary embodiment of the present invention, the sensor device 102 is of a very low thickness, preferably of around 3 mm and has an outer casing for protecting and covering the housing. The outer casing may be a robust and rugged thin cover made of a material, (e.g. mesh, latex, cloth, polymer etc.) that firmly holds the array of sensors in a fixed position. In another exemplary embodiment of the present invention, the sensor device 102 comprises, vibroacoustic sensors, piezoelectric sensors, etc. for capturing and amplifying micro-vibrations generated by the subject's body. The sensor device 102 may be of particular shapes and sizes that may include, but is not limited to, rectangular, square, circular, oval etc. The sensor device 102 is capable of being folded and is a lightweight device. In various embodiments of the present invention, the sensor device 102 is used in a non-invasive and contactless manner. The sensor device 102 may be placed under a medium such as a mattress, cushion etc. on which the subject may sit, stand, lie down or sleep. The sensor device 102 may be aligned in any resting position such as, but is not limited to, sitting position, lying down position etc. with respect to the subject.

Figure 2:
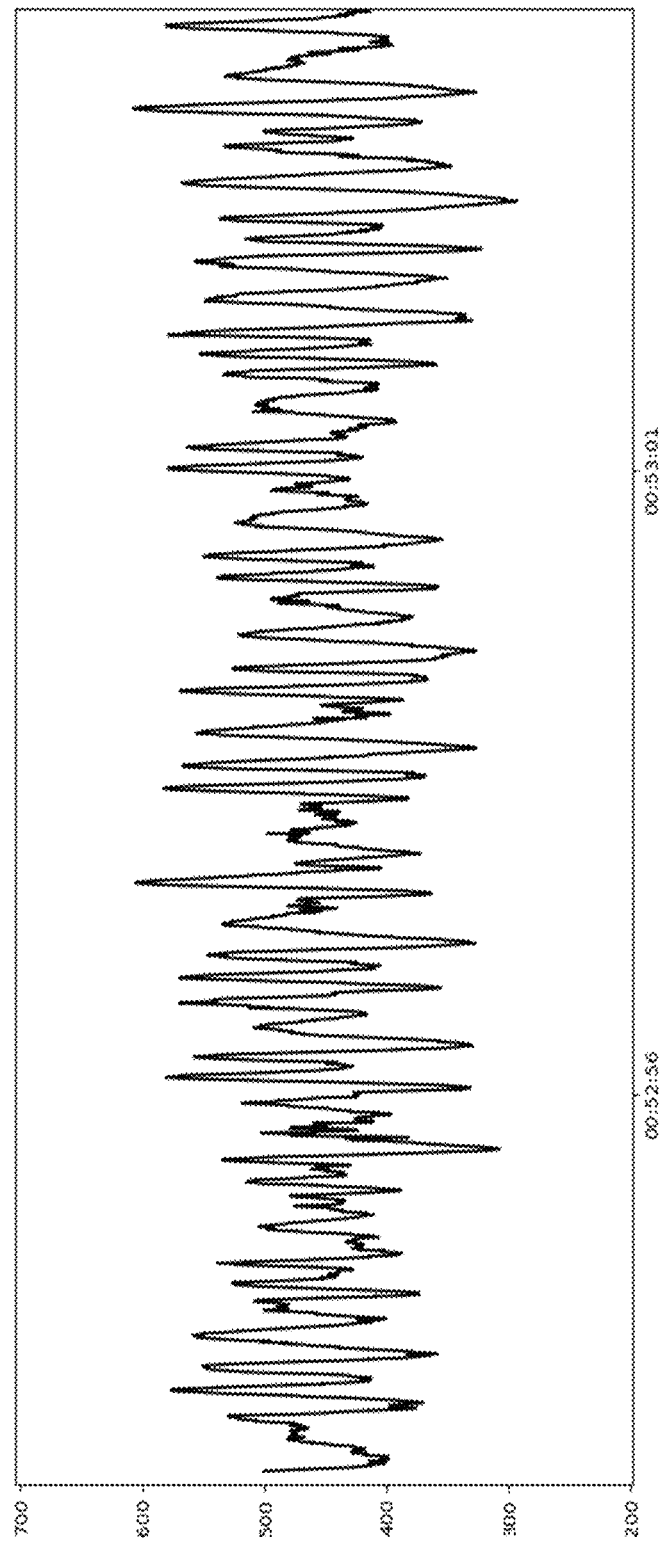
FIG. 2 illustrates captured ballistocardiographic (BCG) signals generated by a subject's body, in accordance with an embodiment of the present invention.

In an embodiment of the present invention, the sensor device 102, positioned in a contactless manner at the subject's end, is configured to capture micro-vibrations generated by the subject's body as analog data signals. The sensor device 102 is capable of capturing micro-vibrations received through a medium placed between the subject and sensor device 102. For example, the micro-vibrations may be captured through a medium ranging from a thin surface to a thick surface such as a 20-inch mattress. The micro-vibrations captured by the sensor device 102 may include, but are not limited to, ballistocardiographic (BCG) signals, as illustrated in FIG. 2, such as, cardiac cycles or heart rates, heart movements, chest movements, body movements, respiration (pulmonary) signals etc. Further, the sensor device 102 is configured to convert the captured micro-vibrations, which are analog signals, into micro-voltage digital signals, which are further amplified.

In an embodiment of the present invention, the data capturing subsystem 104 is configured to receive the micro-voltage digital signals from the sensor device 102. The sensor device 102 is connected to the data capturing subsystem 104 via a wired or wireless connection. The data capturing subsystem 104 may be positioned at the subject's location. In various embodiments of the present invention, the data capturing subsystem 104 comprises a data capturing engine 106, a processor 114 and a memory 116. The data capturing engine 106 comprises multiple units that operate in conjunction with each other for capturing, processing and transmitting the data received from the sensor device 102 to the data receiver unit 118. The various units of the data capturing engine 106 are operated via the processor 114 specifically programmed to execute instructions stored in the memory 116 for executing respective functionalities of the units of the engine 106 in accordance with various embodiments of the present invention.

In an embodiment of the present invention, the data capturing engine 106 comprises a data acquisition unit 108, a conditioning unit 110 and a transmission unit 112.

In an embodiment of the present invention, the data acquisition unit 108 of the data capturing engine 106 is configured to receive the micro-voltage digital signals from the sensor device 102 and record the received micro-voltage digital signal in a pre-defined data recording format. The pre-defined data recording format may include, but is not limited to, a chronological format.

In an embodiment of the present invention, the data acquisition unit 108 transmits the recorded micro-voltage digital signals to the conditioning unit 110. The conditioning unit 110 is configured to amplify the micro-voltage digital signals for maximizing resolution of the micro-voltage digital signals, as desired, to accurately process the micro-voltage digital signals. The maximization of resolution of micro-voltages digital signal is carried out without data loss or information loss that may occur due to clipping. Advantageously, amplification and resolution maximization of the micro-voltage digital signal aids the sensor device 102 to operate with any thickness and construction of medium between the sensor device 102 and the subject. The conditioning unit 110 is configured with multiple amplification capabilities for amplifying the micro-voltage digital signals depending upon the strength of the received micro-voltage digital signals from the data acquisition unit 108. In an exemplary embodiment of the present invention, the multiple amplification capabilities embedded in the conditioning unit 110 provides, but are not limited to, eight different amplification options that amplify the micro-voltages between the range of 15× to 2500×. The conditioning unit 110 is configured to automatically calibrate and select the amplification option. The conditioning unit 110 is based on a sensitivity shifting mechanism for automatically calibrating and selecting the amplification option. The sensitivity shifting mechanism depends upon the level of strength of the micro-voltage digital signals received from the sensor device 102.

In an embodiment of the present invention, the transmission unit 112 of the data capturing engine 106 is configured to receive and transmit the amplified micro-voltage digital signal to the data receiver 118 at regular time intervals. The amplified micro-voltage digital signal is transmitted to the data receiver unit 118 via a communication channel (not shown). The communication channel (not shown) may include, but is not limited to, a wire or a logical connection over a multiplexed medium, such as, a radio channel in telecommunications and computer networking. Examples of telecommunications and computer networking may include a local area network (LAN), a metropolitan area network (MAN), a wide area network (WAN) or any wired or wireless network, such as, but is not limited to, Wi-Fi, Bluetooth Classic and Bluetooth Low Energy. In an exemplary embodiment of the present invention, the data receiver unit 118 may be positioned at the location of the sensor device 102 and the data capturing subsystem 104. For example, the data receiver unit 118 may be installed on a smartphone, tablet, laptop, computer system etc. of the subject. In another exemplary embodiment of the present invention, the data receiver unit 118 may be positioned at a location remote to the sensor device 102 and the data capturing subsystem 104, such as, in a cloud based server. In an embodiment of the present invention, the data receiver unit 118 is configured to store the micro-voltage digital signals in a pre-defined data storage format, which may include, but is not limited to, a chronological format in the form of datasets.

In an embodiment of the present invention, the data receiver unit 118 communicates with the identification subsystem 120. The identification subsystem 120 comprises an identification engine 122, a processor 124 and a memory 126. In an embodiment of the present invention, the identification engine 122 comprises multiple units that operate in conjunction with each other for processing the data received from the data receiver unit 118. The various units of the data capturing engine 122 are operated via the processor 124 specifically programmed to execute instructions stored in the memory 126 for executing respective functionalities of the units of the engine 122 in accordance with various embodiments of the present invention.

In an embodiment of the present invention, the identification engine 122 comprises a computation unit 128, a prediction unit 130 and a database 132.

Figure 3:
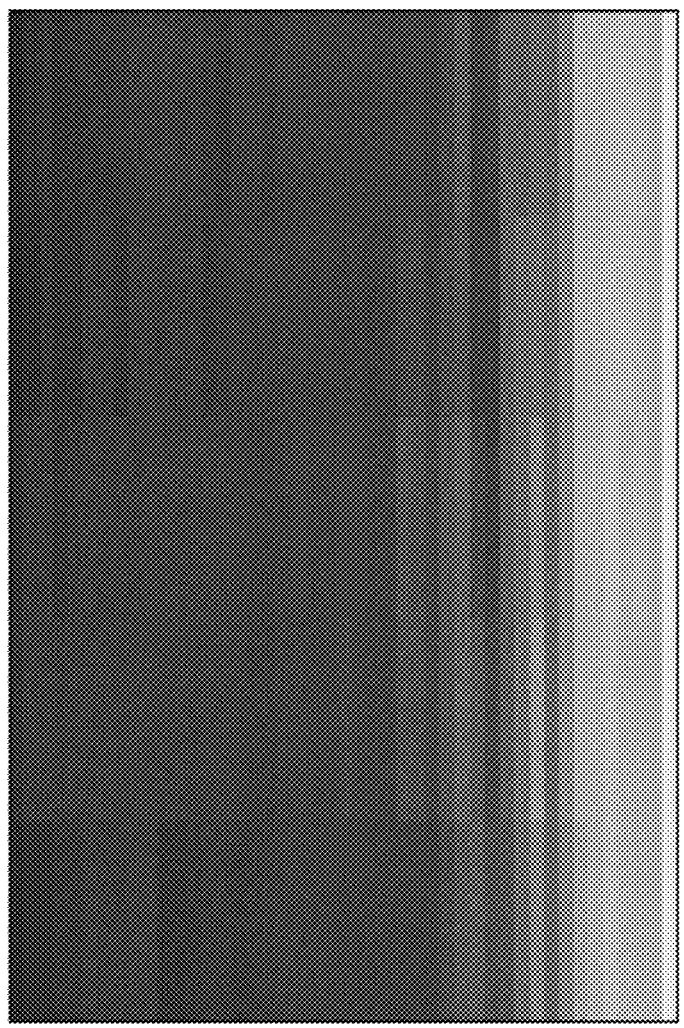
FIG. 3 illustrates a Melspectrogram in a frequency domain in a range of between 0 Hz-45 Hz, in accordance with an embodiment of the present invention.

In an embodiment of the present invention, the computation unit 128 is configured to receive the micro-voltage digital signals from the data receiver unit 118. The computation unit 128 is configured to process the received micro-voltage digital signals for segmenting into intervals of a pre-defined time period. In an exemplary embodiment of the present invention, intervals of the pre-defined time period comprises ±10 seconds. In an embodiment of the present invention, the computation unit 128 is configured to transform the segmented micro-voltage digital signals into a frequency domain in order to compute the said frequency domain on a Mel's scale. The computation of frequency domain on the Mel's scale provides a unique signature of the subject in the form of a Melspectrogram image, as illustrated in FIG. 3. FIG. 3 illustrates the Melspectrogram image in the frequency domain in a range of between 0 Hz-45 Hz.

In an embodiment of the present invention, the prediction unit 130 of the identification engine 122 is configured to receive the computed Melspectrogram images from the computation unit 128. The prediction unit 130 is configured to analyze and process the Melspectrogram images for efficiently predicting the identity of the subject. The prediction unit 130 uses cognitive computing techniques such as, but are not limited to, deep learning techniques for predicting the identity of the subject based on analysis and processing of the Melspectrogram image. The deep learning techniques comprise neural networks which may include, but are not limited to, a Deep Neural Network (DNN), a Long Short Term Memory Network (LSTM) and a Convolutional Neural Network (CNN). In an embodiment of the present invention, the prediction unit 130 is configured to generate a deep learning model using the neural networks associated with the deep learning techniques for efficiently predicting the identity of the subject from the Melspectrogram image. The architecture of the deep learning model comprises pre-defined number of neural network layers, which are stacked together, through which the Melspectrogram image is passed in order to extract features from the Melspectrogram images for identifying the subject. The features are associated with the subject.

Figure 4:
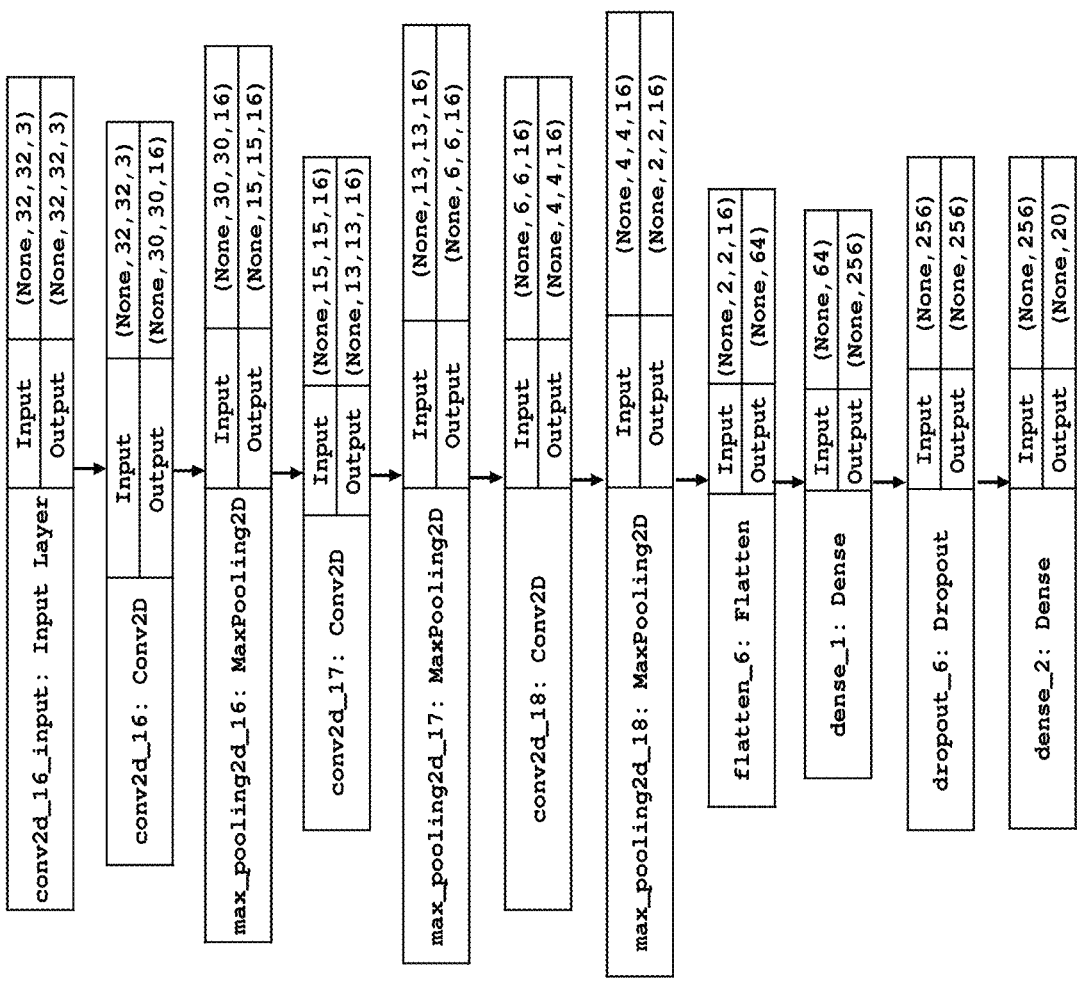
FIG. 4 illustrates a deep learning model architecture, in accordance with an embodiment of the present invention.

In an exemplary embodiment of the present invention, the pre-defined number of neural network layers of the deep learning model architecture comprises three convolution 2-D layers paired with three max pooling 2-D layers respectively, two dense layers, a flattening layer between the two dense layers and a dropout layer, as illustrated in FIG. 4. The number and sequence of neural network layers of the deep learning model architecture may vary, in accordance with various embodiments of the present invention. In an embodiment of the present invention, the three convolution 2-D layers which are paired with max pooling 2-D layers are used for extracting required features in the form of a feature map from the Melspectrogram images and for subsequently carrying out downsampling. The flattening layer provides passing of a 1-D tensor associated with the Melspectrogram images to the dense layer. Further, the dropout layer between the two dense layers aids in preventing the deep learning model from over fitting.

In an embodiment of the present invention, the deep learning model is generated using pre-defined number of neural network layers, which is subsequently trained with multiple training datasets prior to predicting the identity of the subject. The training datasets are associated with multiple subjects and generated based on capturing the subject's micro-vibrations, when the subject is in a resting position (e.g. sleeping) and converted into the Melspectrogram image. In an embodiment of the present invention, the training datasets used for training relates to different subjects. Multiple datasets of different subjects are provided to the prediction unit 130 for training the deep learning model. In an embodiment of the present invention, the training datasets are pre-processed and inputted to the prediction unit 130 along with labels for training the deep learning model. Labels used in training of the deep learning model represent ground truth associated with each Melspectrogram image. In an embodiment of the present invention, the training datasets comprise input images associated with multiple subjects, the input images are Melspectrogram images in a 4-D format, with dimensions "batch_size, height, width, depth", such that batch_size=a number of training images in one forward pass; height (H)=height of the image; width (W)=width of the image; and depth (D)=number of color channels of the image.

In an embodiment of the present invention, during training, the prediction unit 130 trains the deep learning model by passing the Melspectrogram images through the convolution layers and max pooling 2-D layers along with the respective labels. The batch_size of the output images remains same as that of input Melspectrogram images, while the other dimensions (i.e. height (H), width (W) and depth (D)) change based on number of filters, kernels and padding of the convolution layers. In an exemplary embodiment of the present invention, the filters of the convolution layer of the deep learning model architecture comprises light color regions (e.g. yellow regions) and dark color regions (e.g. dark blue regions), as illustrated in FIG. 5, such that the light color (yellow) region in the filter represents a value '1', and the dark color (blue) region in the filter represents a value '0'. FIG. 5 illustrates initial six filters from the convolutional layer of the deep learning model architecture.

In an embodiment of the present invention, the prediction unit (130) passes the Melspectrogram image through the three convolution 2-D layers paired with three max pooling 2-D layers by providing the Melspectrogram image as an input to a first convolution layer and the output of the first convolution layer is provided as an input to the first max pooling 2-D layer. The first max pooling 2-D layer generates an output image with further modified dimensions, which is provided as an input to a second convolution layer and output of the second convolution layer is provided as an input to a second max pooling 2-D layer. The output of the second max pooling 2-D layer is provided as an input to a third convolution layer and output of the third convolution layer is provided as an input to a third max pooling 2-D layer, as illustrated in FIG. 4. Therefore, multiple Melspectrogram images associated with different subjects are provided for training the deep learning model and the deep learning model is trained based on providing different training datasets.

In an embodiment of the present invention, in operation, subsequent to training of the deep learning model, the trained deep learning model is implemented for computing the identity of the subject. A Melspectrogram image associated with a subject is passed through the trained deep learning model for computing the identity of the subject. The trained deep learning model is configured to extract features associated with the Melspectrogram image into a feature map to obtain predicted labels associated with the subject. The predicted labels are obtained based on labels used for training the deep learning model and for computing the identity of the subject. The trained deep learning model classifies the Melspectrogram image associated with the subject based on the trained labels in order to identify the subject. In an embodiment of the present invention, the input Melspectrogram image, associated with the subject, is pre-processed for computing a Melspectrogram image of a dimension "None, 32, 32, 3" which is provided as an input to the first convolution layer of the deep learning model by the prediction unit 130. The dimension 'None' represents various numbers of images which are provided while training and therefore represents a batch size. "32, 32, and 3" represents height (H1), width (W1) and depth (D1) respectively of the Melspectrogram image. The first convolution layer thereafter generates an output of a dimension "None, 30, 30, 16". In an exemplary embodiment of the present invention, the output is generated by the first convolution layer based on the following computation: as the input Melspectrogram image is of a dimension "None, 32, 32, 3" and if the number of filters (K1) used in first convolution layer is 16, strides (S) is 1 and spatial extent of filters (F) is 3 with 0 padding (P), then the output generated by first convolution layer is computed as: H1=(W1−F+2*P)/S+1; W1=(W1−F+2*P)/S+1; and D1=K1. Thus, H1=(32−3+ 1*0)/1+1=30; W1=(32−3+1*0)/1+1=30; and D1=16. Strides represent a parameter of the neural network's filter that modifies the amount of movement over the image pixel. Therefore, the output generated by the first convolution layer is of the dimension "None, 30, 30, 16". Further, the output from the first convolution layer is provided as an input to the first max pooling 2-D layer, which uses a shape of dimensions (2, 2) (i.e. (H, W)), for reducing dimensions of the output received from the first convolution layer for generating an output of a dimension "None, 15, 15, 16", such that, 'None' represents various numbers of images which are provided while training and 15, 15 and 16 represents height, width and depth of the output. Further, the output from the first max pooling 2-D layer is provided as an input to the second convolution layer. The second convolution layer generates an output of a dimension (None, H2, W2, D2) based on the following computation: H2=(15−3+ 1*0)/1+1=13; W2=(15−3+1*0)/1+1=13; and D2=16. Therefore, the output generated by the second convolution layer is of a dimension "None, 13, 13, 16", such that, 'None' represents various numbers of images which are provided while training and "13, 13, 16" represents height (H2), width (W2) and depth (D2) of the output. Further, the output from the second convolution layer is provided as an input to the second max pooling 2-D layer, which reduces the dimension of the input to a dimension "None, 6, 6, 16", such that, 'None' represents various numbers of images which are provided while training and "6, 6, 16" represents height, width and depth of the output. Similarly, the output from the second max pooling 2-D layer is provided to the third convolution layer for generating an output of a dimension "None, 4, 4, 16", wherein 'None' represents various numbers of images which are provided while training and "4, 4, 16" represents height (H3), width (W2) and depth (D3) of the output. Further, the output from the third convolution layer is provided as an input to a third max pooling 2-D layer, which generates an output of a dimension "None, 2, 2, 16", such that, 'None' represents various numbers of images which are provided while training and "2, 2, 16" represents height, width and depth of the output. The output from the third max pooling 2-D layer is provided to a flattening layer, which multiplies the dimensions together as (2*2*16) for generating an output of a dimension "None, 64". The output from the flattening layer is provided as an input to the first dense layer, for generating an output of a dimension "None, 256". Further, the output from the first dense layer is provided as an input to a dropout layer for generating an output of a dimension "None, 256". Further, the output from the dropout layer is provided as an input to the second dense layer for generating as an output of a dimension "None, 20", and value "20" represents number of labels. Further, the output from is the second dense layer associated with the predicted label used for identifying the subject. The predicted labels represent response of the trained deep learning model for classification of the Melspectrogram image associated with the new subject. The output of every layer of the trained deep learning model, having different weights, is provided in Table 1, as illustrated below:

TABLE 1

| Layer (type) | Output Shape | Param # |
| --- | --- | --- |
| conv2d_16 (Conv20) | (None, 30, 30, 16) | 448 |
| max_pooling2d_16 (Maxpooling | (None, 15, 15, 16) | 0 |
| conv2d_17 (Conv20) | (None, 13, 13, 16) | 2320 |
| max_pooling2d_17 (MaxPooling | (None, 6, 6, 16) | 0 |
| conv2d_18 (Conv20) | (None, 4, 4, 16) | 2320 |
| max_pooling2d_18 (MaxPooling | (None, 2, 2, 16) | 0 |
| flatten_6 (Flatten) | (None, 64) | 0 |
| dense_1 (Dense) | (None, 256) | 16640 |
| dropout_6 (Dropout) | (None, 256) | 0 |
| dense_2 (Dense) | (None, 20) | 5140 |

Total params: 26,868
Trainable params: 26,868
Non-trainable params: 0

In an embodiment of the present invention, the prediction unit 130 is configured to compute parameters (Param #) by implementing the first convolution layer, the second convolution layer, the third convolution layer, the first dense layer and the second dense layer of the trained deep learning model, as illustrated in Table 1. The parameters represent the number of learnable elements in a convolution layer and are also computed during the training of the deep learning model, prior to the implementation of the trained deep learning model. In an embodiment of the present invention, the number of parameters are computed based on the number of filters (K) used along with their kernel size (KZ), a bias and number of filters in the previous layer (D) using the following computation: Number of Parameters (Param#)=K(D*(KZ)+1). In an exemplary embodiment of the present invention, if in the first convolution layer the number of filters (K) are 16 and the kernel size (KZ) is (3, 3), then the number of parameters for the first convolution layer is: Param #1=16*(3*(3*3)+1)=448. Further, for the second convolution layer, the number of parameters (Param #2) is: Param #2=16*(16*(3*3)+1)=2320. Yet further, for the third convolution layer, the number of parameters (Param #3) is: Param #3=16*(16*(3*3)+1)=2320. For the first dense layer, the number of parameters (Param #4) is: Param#4=256*(64+1)=16640; and further for second dense layer, the number of parameters (Param #5) is: Param #5=20*(256+1)=5140. Therefore, number of total parameters is 26,868 (i.e. 448+2320+2320+16640+5140), and number of trainable parameters is 26,868, as illustrated in Table 1. The trainable parameters represent the parameters used for training the deep learning model.

Figure 7:
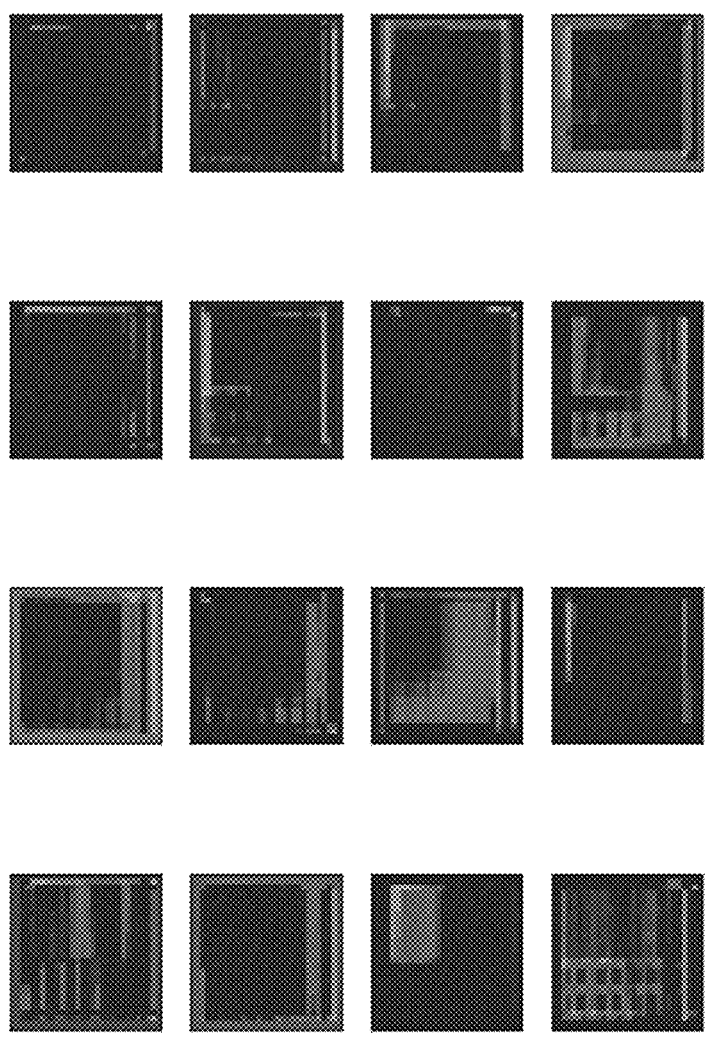
FIG. 7 illustrates a feature map of a transformed Melspectrogram image associated with a subject 2 after passing through the filters of the convolution layer, in accordance with an embodiment of the present invention.
Figure 8A:
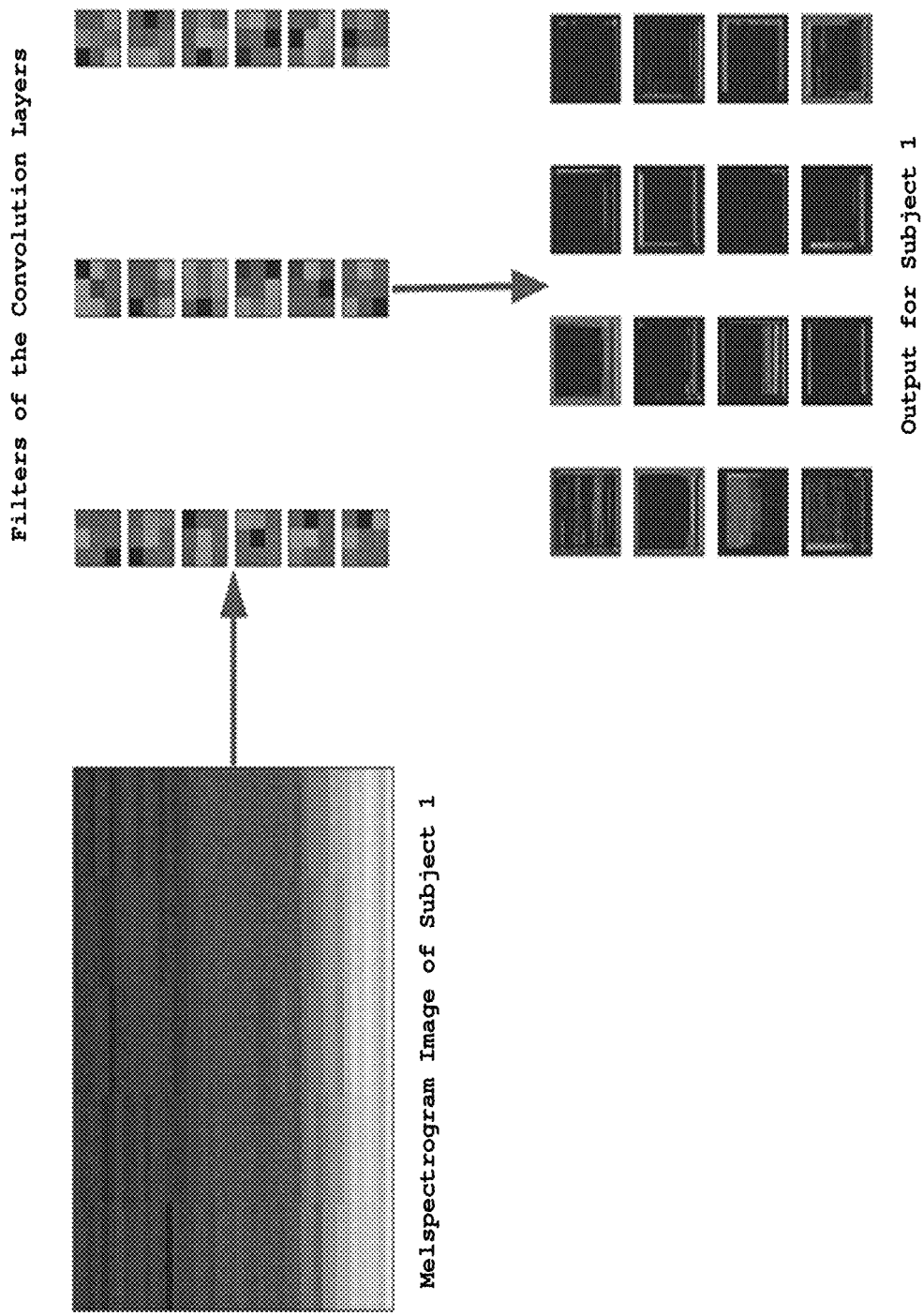
FIG. 8a and FIG. 8b illustrates a flow of the Melspectrogram image of the subject 1 and the subject 2, which is provided to the convolution layers of the trained deep learning model and is passed through the filters of the convolution layers for providing an output image, in accordance with an embodiment of the present invention.
Figure 8B:
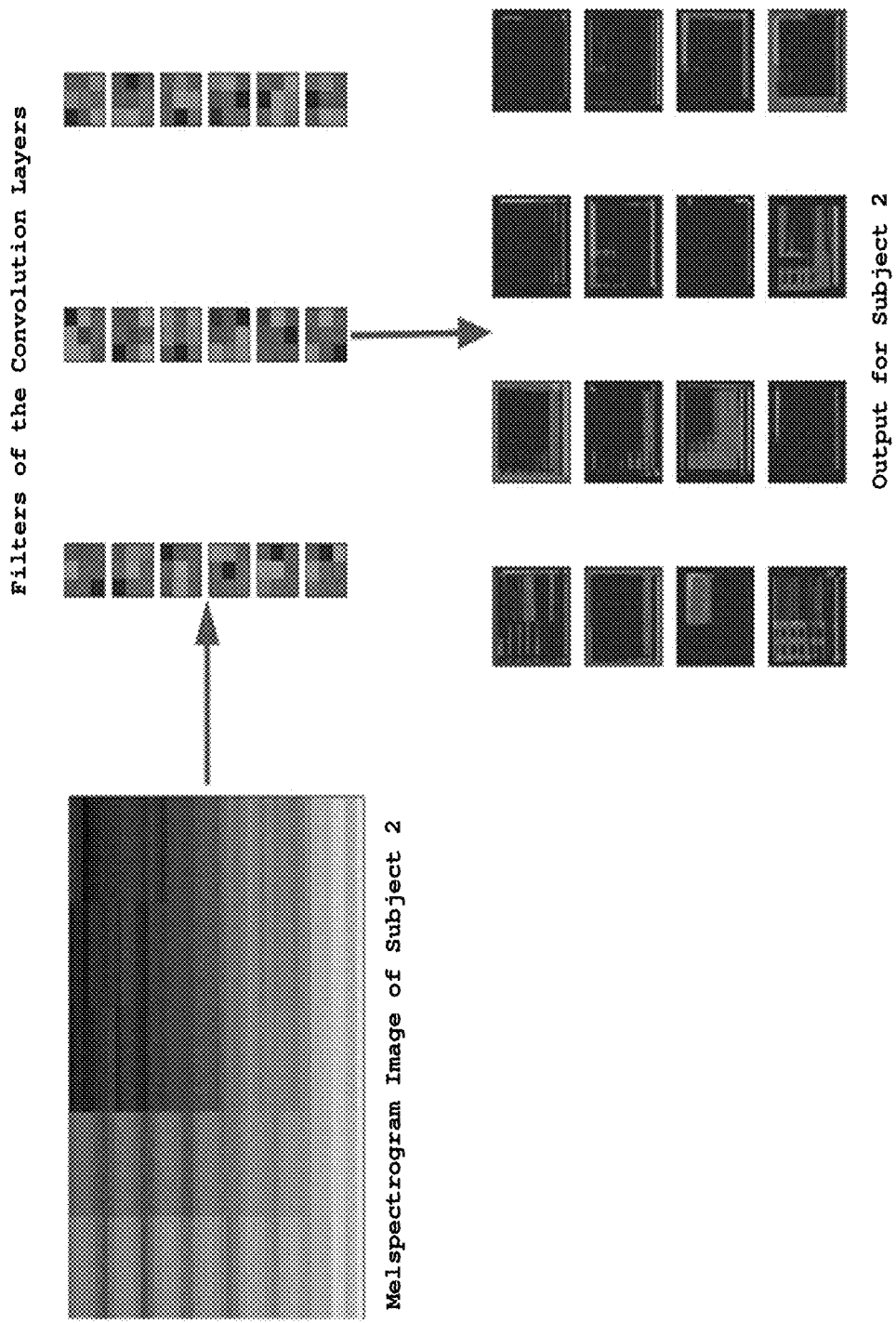
Figure 9:
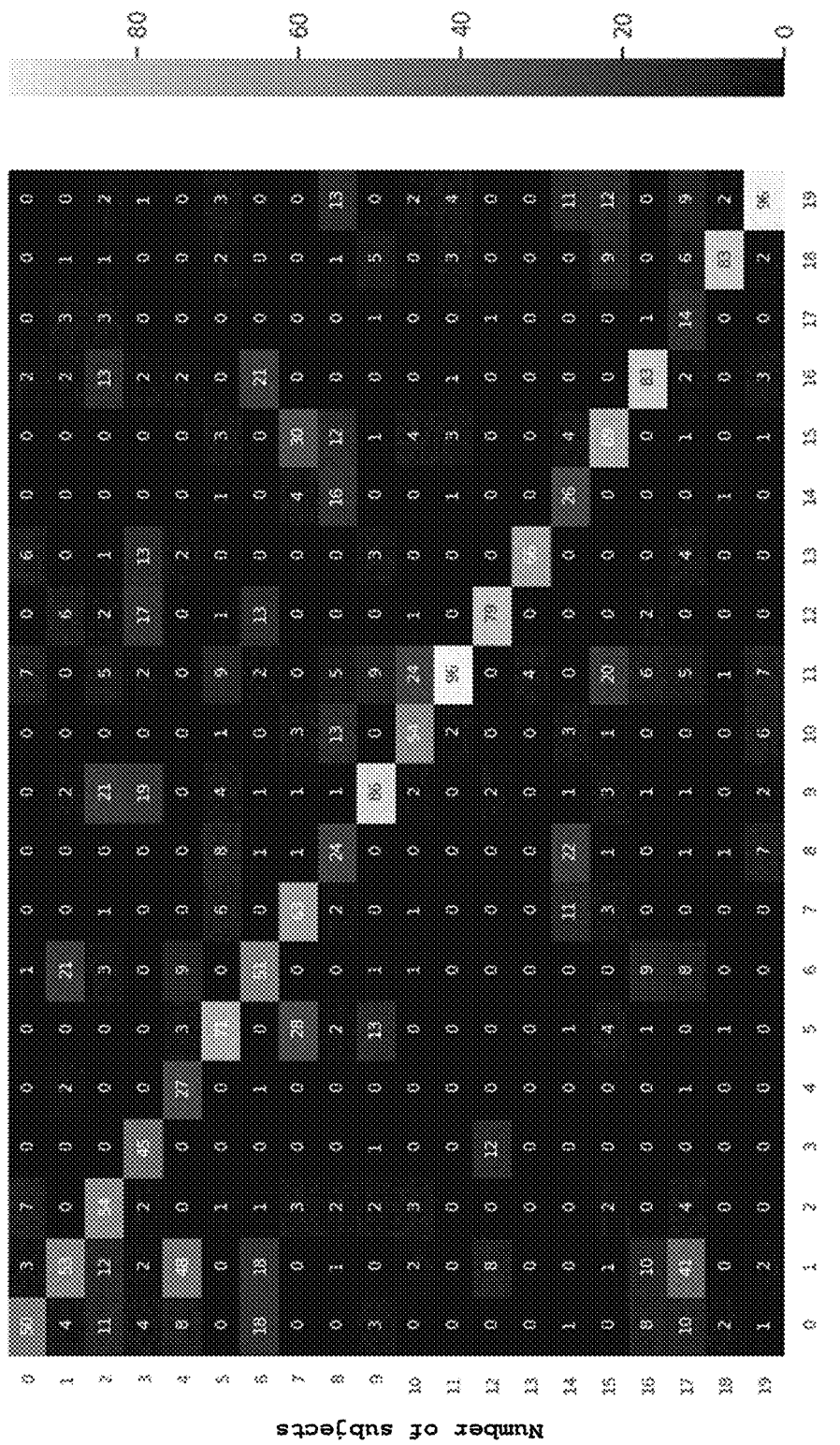
FIG. 9 illustrates a confusion matrix in a grid form providing training accuracy and execution accuracy of the deep learning model for over 20 subjects, in accordance with an embodiment of the present invention.

In an embodiment of the present invention, the prediction unit 130 is configured to transform the output from the second dense layer associated with a subject's Melspectrogram image (e.g. subject 1 and a subject 2) in a feature map for obtaining predicted labels by implementing the convolution layer filters present in the convolution layer of the trained deep learning model, as illustrated in FIG. 6 and FIG. 7 respectively, in order to identify the subject. Further, FIG. 6 and FIG. 7 illustrates feature map which is generated based on passing the Melspectrogram image through the convolution layer filters (as illustrated in FIG. 5). The feature maps presented in FIG. 6 and FIG. 7 capture the result of applying the filters as shown in FIG. 5 to the input i.e. the Melspectrogram image. In an embodiment of the present invention, the trained deep learning model is applied for different subjects for identifying and distinguishing one subject (subject 1) from another subject (subject 2). The Melspectrogram image of a particular subject is provided to the convolution layers of the trained deep learning model, which is passed through the filters of the convolution layers, and provided as the feature map for distinguishing and identifying the subject 1 and the subject 2 respectively, as illustrated in a flow diagram in FIG. 8a and FIG. 8b. The trained model provides accuracy and sensitivity in identifying and distinguishing one subject from another subject based on computing the identity of the subject. Advantageously, the training accuracy of the deep learning model for over 20 subjects is computed to be 86.65% with execution accuracy of 56%, as illustrated in a confusion matrix in FIG. 9. The accuracy of the deep learning model is determined based on comparing predicted labels with the ground truth labels. Further, FIG. 9 represents the confusion matrix providing the data associated with validation accuracy of the deep learning model where rows represent actual or true labels and columns represent the predicted labels. Further, higher the density of diagonal in the confusion matrix, greater is the validation accuracy of the deep learning model.

In an embodiment of the present invention, the prediction unit 130 is configured to transmit identity data associated with the computed identity of the subject to the database 132 for storage and future retrieval. The database 132 may be located locally or remotely with respect to the identification subsystem 120. The database 132 may be located locally on a standalone smartphone, laptop, tablet, a desktop computer, etc. at the subject's end. The database 132 may be located remotely on a cloud server. In an embodiment of the present invention, the user device 134 is configured to connect to the database 132 for retrieving the stored subject's identity data. The user device 134 may include, but is not limited to, a smartphone, a tablet, a smartwatch, a computed system and a laptop. The subject may download an application on the user device 134 or use a web address (e.g. a Universal Resource Locator (URL)) in order to connect to the database 132 for retrieving, accessing and viewing the subject's identity data. Further, the application and the web address provides a Graphical User Interface (GUI) in a dashboard form for viewing the subject's identity data. In an embodiment of the present invention, the user device 134 via the application or the web address is configured to uniquely authorize each subject by registering and providing access to subjects for viewing the stored identity data. Further, the subject's identity data may be accessed by at least, the subject itself, subject's doctor, subject's caretaker, an insurer or any other person related to subject in order to correctly and effectively determine the identity of the subject.

In an embodiment of the present invention, the identification subsystem 120 is further configured to compute health data of the subject based on the identity data of the subject. Further, the health data of a non-intended subject which may have been captured and tagged intentionally or unintentionally along with the health data of the intended subject is removed based on the identity data of the identified subject. An intended subject is a subject, whose health data is required to be captured and a non-intended subject is a subject, whose health data is not required to be captured. Further, the health data captured from an intended subject and a non-intended subject is distinguished for preventing mixing of the health data of the intended subject and the non-intended subject.

In an embodiment of the present invention, the identification subsystem 120 is configured to couple the identity data of the identified subject with subject's biometric data (e.g. subject's retina scan, subject's fingerprints etc.) for providing a double layer secure authentication. For example, an insurer may use subject's biometric data for identifying the subject in order to provide any special offers, however, the biometric data of the said subject may be manipulated by another subject and the benefits of the insurance may be wrongly appropriated by the said another subject. Coupling of subject's identity data, computed in accordance with various embodiments of the present invention, with the subject's biometric data prevents such wrong appropriation, as the identity data of a particular subject is unique to the said subject and cannot be manipulated.

Figure 10:
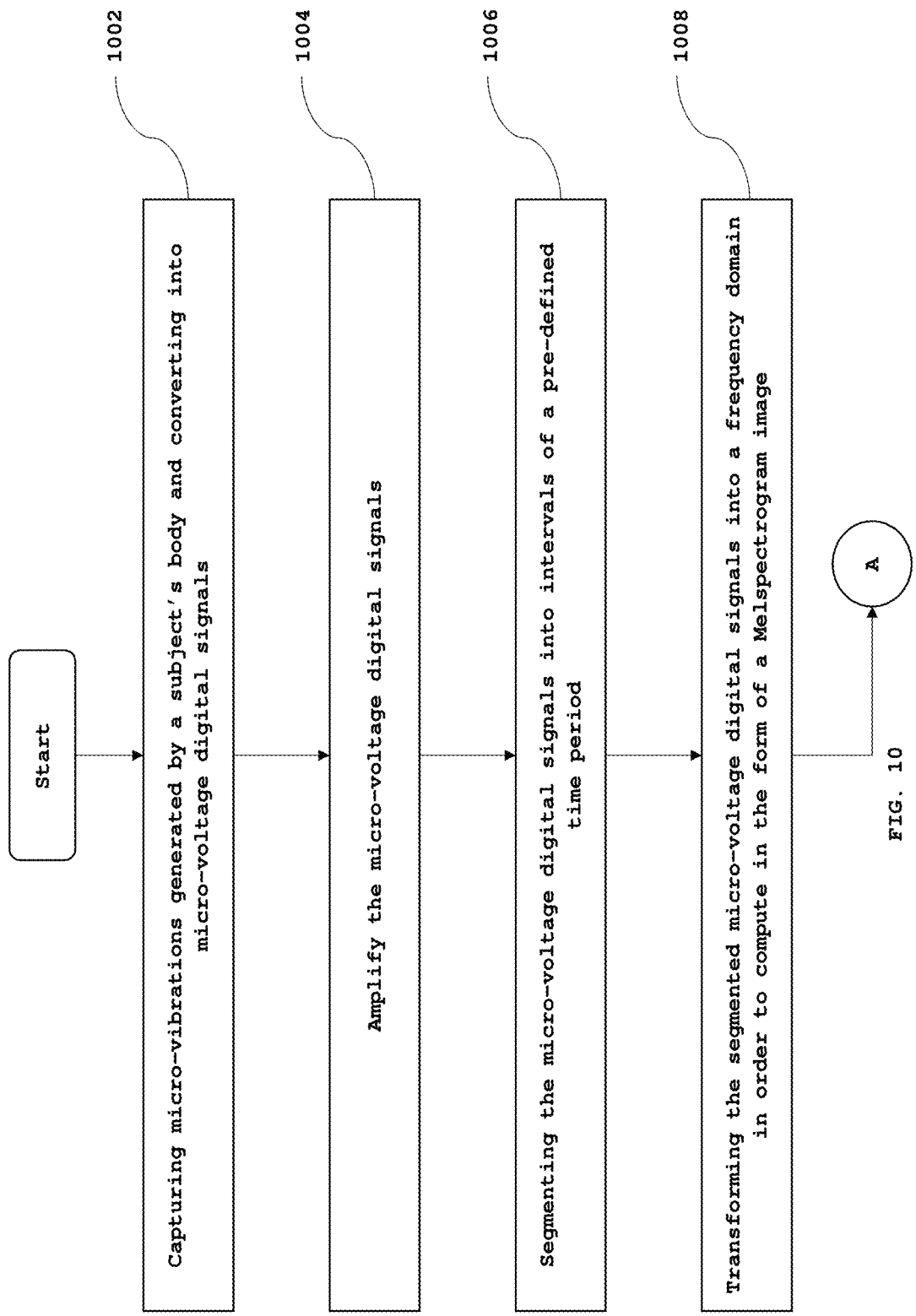
FIG. 10 and FIG. 10A illustrates a method for efficiently identifying a subject, in accordance with an embodiment of the present invention.
Figure 10A:
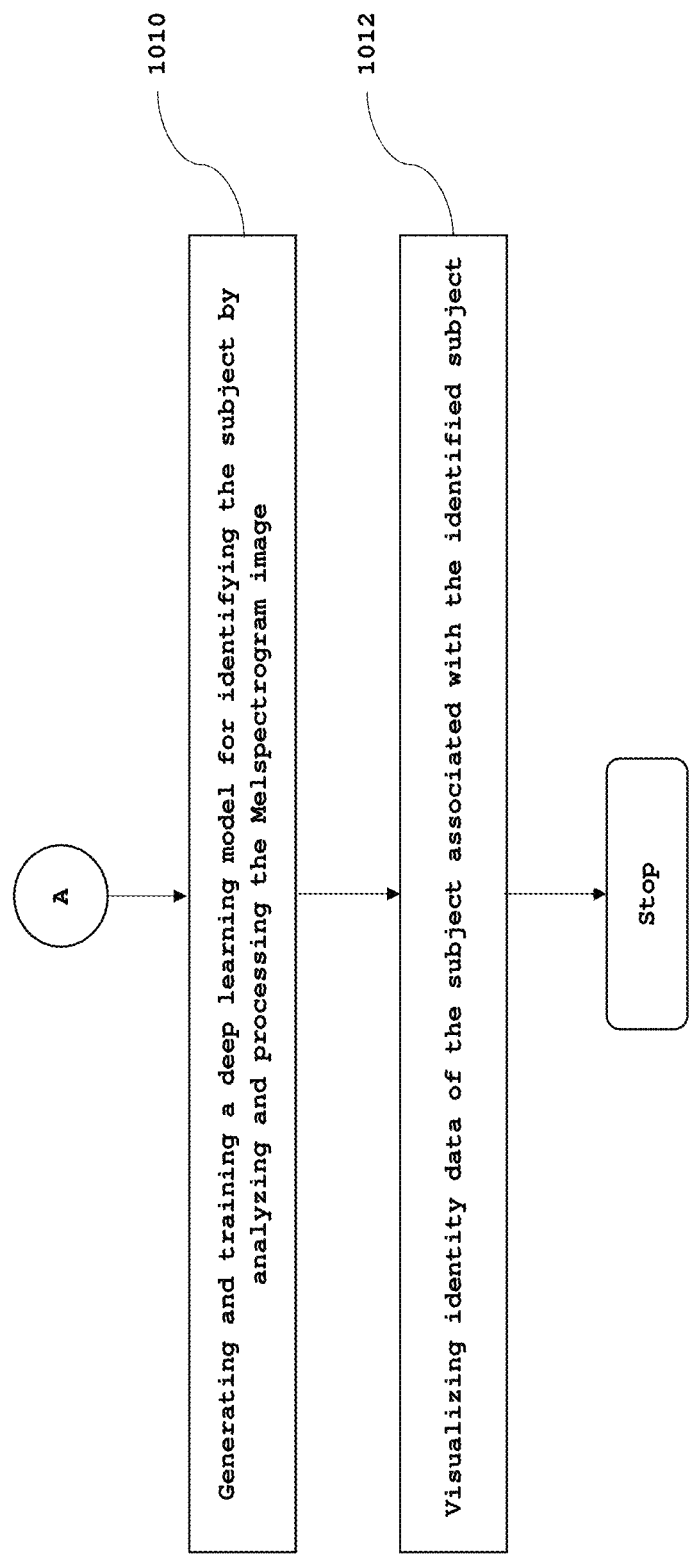

FIG. 10 and FIG. 10A illustrates a method for efficiently identifying a subject, in accordance with various embodiments of the present invention.

At step 1002, micro-vibrations generated by a subject's body are captured and converted into micro-voltage digital signals. In an embodiment of the present invention, micro-vibrations generated by the subject's body are captured as analog data signals. The captured micro-vibrations may include, but are not limited to, ballistocardiographic (BCG) signals such as, cardiac cycles or heart rates, heart movements, chest movements, body movements, respiration (pulmonary) signals etc. Further, the captured micro-vibrations, which are analog signals, are convert into micro-voltage digital signals.

At step 1004, the micro-voltage digital signals are amplified. In an embodiment of the present invention, the micro-voltage digital signals are recorded in a pre-defined data recording format. The pre-defined data recording format may include, but is not limited to, a chronological format. Further, the recorded micro-voltage digital signals are amplified for maximizing resolution of the micro-voltage digital signals, as desired, to accurately process the micro-voltage digital signals. The maximization of resolution of micro-voltages digital signal is carried out without data loss or information loss that may occur due to clipping. The micro-voltage digital signals are amplified depending upon the strength of the received micro-voltage digital signals. In an exemplary embodiment of the present invention, the amplification capabilities provides, but are not limited to, eight different amplification options that amplify the micro-voltages between the range of 15× to 2500×. The amplification option is automatically calibrated and selected. Further, a sensitivity shifting mechanism is used for automatically calibrating and selecting the amplification option. The sensitivity shifting mechanism depends upon the level of strength of the micro-voltage digital signals.

In an embodiment of the present invention, the amplified micro-voltage digital signal are transmitted regular time intervals via a communication channel for storage in a pre-defined data storage format, which may include, but is not limited to, a chronological format in the form of datasets.

At step 1006, the micro-voltage digital signals are segmented into intervals of a pre-defined time period. In an embodiment of the present invention, intervals of the pre-defined time period comprises ±10 seconds.

At step 1008, the segmented micro-voltage digital signals are transformed into a frequency domain in order to compute in the form of a Melspectrogram image. In an embodiment of the present invention, the segmented micro-voltage digital signals are transformed into a frequency domain in order to compute the said frequency domain on a Mel's scale. The computation of frequency domain on the Mel's scale provides a unique signature of the subject in the form of a Melspectrogram image.

At step 1010, a deep learning model is generated and trained for identifying the subject by analyzing and processing the Melspectrogram image. In an embodiment of the present invention, the Melspectrogram images are analyzed and processed for efficiently predicting the identity of the subject. Further, cognitive computing techniques such as, but are not limited to, deep learning techniques are used for predicting the identity of the subject and effectively capturing the health data of the subject based on analysis and processing of the Melspectrogram. The deep learning techniques comprise neural networks which may include, but are not limited to, a Deep Neural Network (DNN), a Long Short Term Memory Network (LSTM) and a Convolutional Neural Network (CNN). In an embodiment of the present invention, a deep learning model is generated using the neural networks associated with the deep learning techniques for efficiently predicting the identity of the subject from the Melspectrogram image. The architecture of the deep learning model comprises pre-defined number of neural network layers, which are stacked together, through which the Melspectrogram image is passed in order to extract features from the Melspectrogram images for identifying the subject. The features are associated with the subject.

In an exemplary embodiment of the present invention, the pre-defined number of neural network layers of the deep learning model architecture comprises three convolution 2-D layers paired with three max pooling 2-D layers respectively, two dense layers, a flattening layer between the two dense layers and a dropout layer. The number and sequence of neural network layers of the deep learning model architecture may vary, in accordance with various embodiments of the present invention. In an embodiment of the present invention, the three convolution 2-D layers which are paired with max pooling 2-D layers are used for extracting required features in the form of a feature map from the Melspectrogram images and for subsequently carrying out downsampling. The flattening layer provides passing of a 1-D tensor associated with the Melspectrogram images to the dense layer. Further, the dropout layer between the two dense layers aids in preventing the deep learning model from over fitting.

In an embodiment of the present invention, the deep learning model is generated using pre-defined number of neural network layers, which is subsequently trained with multiple training datasets prior to predicting the identity of the subject. The training datasets are associated with multiple subjects and generated based on capturing the subject's micro-vibrations, when the subject is in a resting position (e.g. sleeping) and converted into the Melspectrogram image. In an embodiment of the present invention, the training datasets used for training relates to different subjects. Multiple datasets of different subjects are provided for training the deep learning model. In an embodiment of the present invention, the training datasets are pre-processed and inputted along with labels for training the deep learning model. Labels used in training of the deep learning model represent ground truth associated with every Melspectrogram image. In an embodiment of the present invention, the training datasets comprises input images associated with multiple subjects, the input images are Melspectrogram images in a 4-D format, with dimensions "batch_size, height, width, depth", such that batch_size=a number of training images in one forward pass; height (H)=height of the image; width (W)=width of the image; and depth (D)=number of color channels of the image.

In an embodiment of the present invention, during training, the deep learning model is trained by passing the Melspectrogram images through the convolution layers and max pooling 2-D layers along with the respective labels. The batch_size of the output images remains same as that of input Melspectrogram image while the other dimensions (i.e. height (H), width (W) and depth (D)) change based on number of filters, kernels and padding of the convolution layers. In an exemplary embodiment of the present invention, the filters of the convolution layer of the deep learning model architecture comprises light color regions (e.g. yellow regions) and dark color regions (e.g. dark blue regions), such that, the light color (yellow) region in the filter represents a value '1', and the dark color (blue) region in the filter represents a value '0'.

In an embodiment of the present invention, the Melspectrogram image is passed through the three convolution 2-D layers paired with three max pooling 2-D layers by providing the Melspectrogram image as an input to a first convolution layer and the output of the first convolution layer is provided as an input to a first max pooling 2-D layer. The first max pooling 2-D layer generates an output image with further modified dimensions, which is provided as an input to a second convolution layer and output of the second convolution layer is provided as an input to a second max pooling 2-D layer. The output of the second max pooling 2-D layer is provided as an input to a third convolution layer and output of the third convolution layer is provided as an input to the third max pooling 2-D layer. Therefore, multiple Melspectrogram images associated with different subjects are provided for training the deep learning model and the deep learning model is trained based on providing different training datasets.

In an embodiment of the present invention, subsequent to training of the deep learning model, the trained deep learning model is implemented for computing the identity the subject. A Melspectrogram image associated with a subject is passed through the trained deep learning model for computing the identity of the subject. The trained deep learning model is configured to extract features associated with the Melspectrogram image into a feature map to obtain predicted labels associated with the subject. The predicted label are obtained based on labels used for training the deep learning model and for computing the identity of the subject. The trained deep learning model classifies the Melspectrogram image associated with the subject based on the trained labels in order to identify the subject. In an embodiment of the present invention, the input Melspectrogram image, associated with the subject is pre-processed for computing a Melspectrogram image of a dimension "None, 32, 32, 3" which is provided as an input to the first convolution layer of the deep learning model. The dimension 'None' represents various numbers of images which are provided while training and therefore represents a batch size. "32, 32, and 3" represents height (H1), width (W1) and depth (D1) respectively of the Melspectrogram image. The first convolution layer thereafter generates an output of a dimension "None, 30, 30, 16". In an exemplary embodiment of the present invention, the output is generated by first convolution layer based on the following computation: as the input Melspectrogram image is of the dimension "None, 32, 32, 3" and if the number of filters (K1) used in first convolution layer is 16, strides (S) is 1 and spatial extent of filters (F) is 3 with 0 padding (P), then the output generated by first convolution layer is computed as: $H1=(W1-F+2*P)/S+1$; $W1=(W1-F+2*P)/S+1$; and $D1=K1$. Thus, $H1=(32-3+1*0)/1+1=30$; $W1=(32-3+1*0)/1+1=30$; and $D1=16$. Strides represent a parameter of the neural network's filter that modifies the amount of movement over the image pixel. Therefore, the output generated by the first convolution layer is of the dimension "None, 30, 30, 16". Further, the output from the first convolution layer is provided as an input to the first max pooling 2-D layer, which uses a shape of dimensions (2, 2) (i.e. (H, W)), for reducing the dimensions of the output received from the first convolution layer for generating an output of a dimension "None, 15, 15, 16" such that, wherein 'None' represents various numbers of images which are provided while training and 15, 15 and 16 represents height, width and depth of the output image. Further, the output from the first max pooling 2-D layer is provided as an input to the second convolution layer. The second convolution layer generates an output of a dimension (None, H2, W2, D2) based on the following computation: $H2=(15'3+1*0)/1+1=13$; $W2=(15-3+1*0)/1+1=13$; and $D2=16$. Therefore, the output generated by the second convolution layer is of a dimension "None, 13, 13, 16" such that, "None" represents various numbers of images which are provided while training and "13, 13, 16" represents height (H2), width (W2) and depth (D2) of the output. Further, the output from the second convolution layer is provided as an input to the second max pooling 2-D layer, which reduces the dimension of the input for generating an output of a dimension "None, 6, 6, 16", such that, "None" represents various numbers of images which are provided while training and "6, 6, 16" represents height, width and depth of the output. Similarly, the output from the second max pooling 2-D layer is provided to the third convolution layer for generating an output of a dimension "None, 4, 4, 16", wherein 'None' represents various numbers of images which are provided while training and "4, 4, 16" represents height (H3), width (W2) and depth (D3) of the output. Further, the output from the third convolution layer is provided as an input to the third max pooling 2-D layer, for generating an output of a dimension "None, 2, 2, 16", such that "None" represents various numbers of images which are provided while training and "2, 2, 16" represents height, width and depth of the output. The output from the third max pooling 2-D layer is provided to the flattening layer, which multiplies the dimensions together as (2*2*16) for generating an output of a dimension "None, 64". The output from the flattening layer is provided as an input to the first dense layer, for generating an output of a dimension "None, 256". Further, the output from the first dense layer is provided as an input to the dropout layer for generating an output of a dimension "None, 256". Further, the output from the dropout layer is provided as an input to the second dense layer for generating an output of a dimension "None, 20", and value "20" represents number of labels. Further, the output from the second dense layer is associated with the predicted label used for identifying the subject. The predicted labels represent response of the trained deep learning model for classification of the Melspectrogram image associated with the new subject.

In an embodiment of the present invention, parameters (Param#) are computed by implementation of the first convolution layer, the second convolution layer, the third convolution layer, the first dense layer and the second dense layer of the trained deep learning model. The parameters represent the number of learnable elements in a convolution layer and are also computed during the training of the deep learning model prior to the implementation of the trained deep learning model. In an embodiment of the present invention, the number of parameters are computed based on the number of filters (K) used along with their kernel size (KZ), a bias and number of filters in the previous layer (D) using the following computation: Number of Parameters (Param#)=K*(D*(KZ)+1). In an exemplary embodiment of the present invention, if in the first convolution layer the number of filters (K) are 16 and the kernel size (KZ) is (3, 3), then the number of parameters for the first convolution layer is: Param #1=16*(3*(3*3)+1)=448. Further, for the second convolution layer, the number of parameters (Param #2) is: Param #2=16*(16*(3*3)+1)=2320. Yet further, for the third convolution layer, the number of parameters (Param #3) is: Param #3=16*(16*(3*3)+1)=2320. For the first dense layer, the number of parameters (Param #4) is: Param #4=256*(64+1)=16640; and further for second dense layer, the number of parameters (Param #5) is: Param #5=20*(256+1)=5140. Therefore, number of total parameters is 26,868 (i.e. 448+2320+2320+16640+5140), and number of trainable parameters is 26,868. The trainable parameters represent the parameters used for training the deep learning model.

In an embodiment of the present invention, the output from the second dense layer associated with a subject's Melspectrogram image (e.g. subject 1 and a subject 2) is transformed in a feature map for obtaining predicted labels by implementing the convolution layer filters present in the convolution layer of the trained deep learning model in order to identify the subject. In an embodiment of the present invention, the trained deep learning model is applied for different subjects for identifying and distinguishing one subject (subject 1) from another subject (subject 2). The Melspectrogram image of a particular subject is provided to the convolution layers of the trained deep learning model, which is passed through the filters of the convolution layers, and provided as the feature map for distinguishing and identifying the subject 1 and the subject 2 respectively. The trained model provides accuracy and sensitivity in identifying and distinguishing one subject from another subject based on computing the identity.

At step 1012, identity data of the subject associated with the identified subject is visualized. In an embodiment of the present invention, identity data associated with the computed identity of the subject is transmitted to a database for storage and future retrieval. The database may be located locally or remotely. The database may be located locally on a standalone smartphone, laptop, tablet, a desktop computer, etc. at the subject's end. The database may be located remotely on a cloud server. In an embodiment of the present invention, the stored subject's identity data is further retrieved using a user device. The user device may include, but is not limited to, a smartphone, a tablet, a smartwatch, a computed system and a laptop. The subject may download an application on the user device or use a web address (e.g. a Universal Resource Locator (URL)) in order to connect to the database for retrieving, accessing and viewing the subject's identity data. Further, the application and the web address provides a Graphical User Interface (GUI) in a dashboard form for viewing the subject's identity data. In an embodiment of the present invention, the user device via the application or the web address is configured to uniquely authorize each subject by registering and providing access to subjects for viewing the stored identity data. Further, the subject's identity data may be accessed by at least, the subject itself, subject's doctor, subject's caretaker, an insurer or any other person related to subject in order to correctly and effectively determine the identity of the subject.

In an embodiment of the present invention, health data of the subject is compute based on the identity data of the subject. Further, the health data of a non-intended subject which may have been captured and tagged intentionally or unintentionally along with the health data of the intended subject is removed based on the identity data of the identified subject. An intended subject is a subject, whose health data is required to be captured and a non-intended subject is a subject, whose health data is not required to be captured. Further, the health data captured from an intended subject and a non-intended subject is distinguished for preventing mixing of the health data of the intended subject and the non-intended subject.

In an embodiment of the present invention, the identity data of the identified subject is coupled with subject's biometric data (e.g. subject's retina scan, subject's fingerprints etc.) for providing a double layer secure authentication. For example, an insurer may use subject's biometric data for identifying the subject in order to provide any special offers, however, the biometric data of the said subject may be manipulated by another subject and the benefits of the insurance may be wrongly appropriated by the said another subject. Coupling of subject's identity data, computed in accordance with various embodiments of the present invention, with the subject's biometric data prevents such wrongful appropriation, as the identity data of a particular subject is unique to the said subject and cannot be manipulated.

Advantageously, in accordance with various embodiments of the present invention, the system and method of the present invention provides efficient identification of a subject based on the captured micro-vibrations associated with the BCG signals generated by the subject's body, which are unique for every subject. The system and method of the present invention further provides correct and accurate determination of health data of the subject based on the computed identity of the subject. The system and method of the present invention provides effective removal of the health data of the non-intended subject, which may have been captured and tagged along with the health data of the intended subject, as the micro-vibrations are different for every subject. Further, the system and method of the present invention provides a non-invasive and double layer secure authenticating techniques for capturing subject's health data based on coupling the micro-vibrations associated with ballistocardiographic (BCG) signals generated by the subject's body with the subject's biometric data. Further, the system and method of the present invention surprisingly provides efficient tracking of any minor change in the subject's Melspectrogram signatures based on a feedback received from the subject by the deep learning model. The feedback is further used to reinforce the weights in the deep learning model. Further, the system and method of the present invention provides efficient collection of subject's BGG signals irrespective of the subject's position (e.g. standing, sitting or lying). Furthermore, the system and method of the present invention provides for accurately capturing all distinctive characteristics of the BCG signal. The system and method of the present invention provides capturing the micro-vibrations generated by the subject's body in a robust manner, as it cannot be replicated. Yet further, the system and method of the present invention is cost effective.

Figure 11:
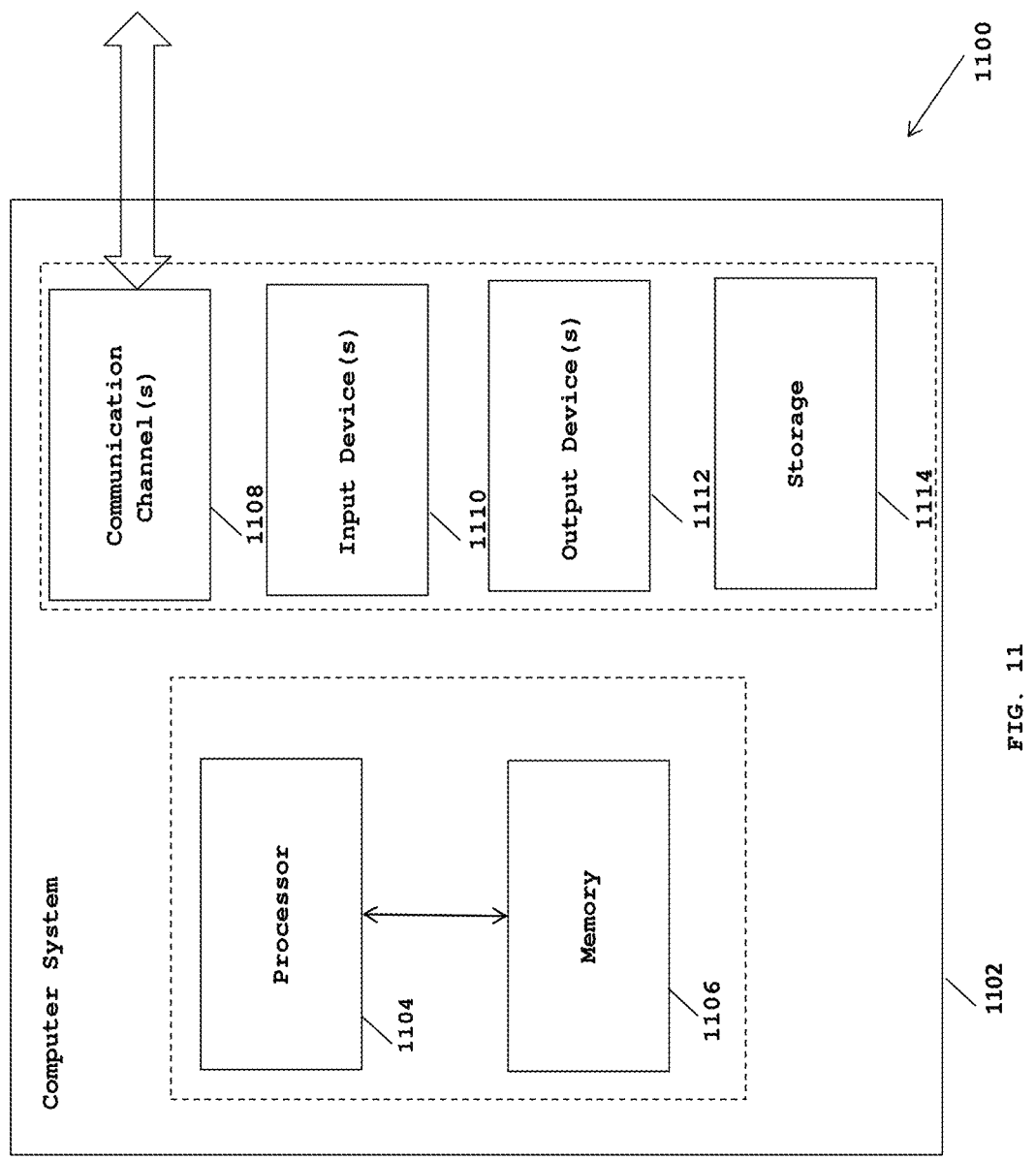
FIG. 11 illustrates an exemplary computer system in which various embodiments of the present invention may be implemented.

FIG. 11 illustrates an exemplary computer system in which various embodiments of the present invention may be implemented. The computer system 1102 comprises a processor 1104 and a memory 1106. The processor 1104 executes program instructions and is a real processor. The computer system 1102 is not intended to suggest any limitation as to scope of use or functionality of described embodiments. For example, the computer system 1102 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1106 may store software for implementing various embodiments of the present invention. The computer system 1102 may have additional components. For example, the computer system 1102 includes one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various software executing in the computer system 1102, and manages different functionalities of the components of the computer system 1102.

The communication channel(s) 1108 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 1110 may include, but not limited to, a keyboard, mouse, pen, joystick, trackball, a voice device, a scanning device, touch screen or any other device that is capable of providing input to the computer system 1102. In an embodiment of the present invention, the input device(s) 1110 may be a sound card or similar device that accepts audio input in analog or digital form. The output device(s) 1112 may include, but not limited to, a user interface on CRT or LCD, printer, speaker, CD/DVD writer, or any other device that provides output from the computer system 1102.

The storage 1114 may include, but not limited to, magnetic disks, magnetic tapes, CD-ROMs, CD-RWs, DVDs, flash drives or any other medium which can be used to store information and can be accessed by the computer system 1102. In various embodiments of the present invention, the storage 1114 contains program instructions for implementing the described embodiments.

The present invention may suitably be embodied as a computer program product for use with the computer system 1102. The method described herein is typically implemented as a computer program product, comprising a set of program instructions which is executed by the computer system 1102 or any other similar device. The set of program instructions may be a series of computer readable codes stored on a tangible medium, such as a computer readable storage medium (storage 1114), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for efficiently identifying a subject, the system comprising:
   a memory storing program instructions;
   a processor configured to execute instructions stored in the memory; and
   an identification engine executed by the processor and configured to:
   segment micro-voltage digital signals into intervals of a pre-defined time period;
   transform the segmented micro-voltage digital signals into a frequency domain for computing on a Mel's scale, wherein the Mel's scale provides a unique signature of the subject in the form of a Melspectrogram image; and
   pass the Melspectrogram image through a trained deep learning model, wherein features associated with the Melspectrogram image are extracted into a feature map for obtaining predicted labels associated with the subject based on labels used during training of the deep learning model for identifying the subject.

2. The system as claimed in claim 1, wherein the intervals of the pre-defined time period comprises ±10 seconds or less.

3. The system as claimed in claim 1, wherein the identification engine comprises a computation unit executed by the processor and configured to receive the micro-voltage digital signals from a data receiver unit and process the micro-voltage digital signals for segmenting into intervals of the pre-defined time period.

4. The system as claimed in claim 1, wherein the identification engine comprises a prediction unit executed by the processor and configured to generate the deep learning model using neural networks associated with the deep learning techniques, and wherein the deep learning techniques comprise a Deep Neural Network (DNN), a Long Short Term Memory Network (LSTM) and a Convolutional Neural Network (CNN).

5. The system as claimed in claim 1, wherein one or more pre-defined number of neural network layers of the deep learning model are stacked together through which the Melspectrogram image is passed, and wherein the pre-defined number of neural network layers of the deep learning model comprises three convolution 2-D layers paired with three max pooling 2-D layers respectively, two dense layers, a flattening layer between the two dense layer and a dropout layer.

6. The system as claimed in claim 5, wherein the three convolution 2-D layers paired with the max pooling 2-D layers are used for extracting features from the Melspectrogram images and subsequently carrying out downsampling, and wherein the features are associated with the subject.

7. The system as claimed in claim 5, wherein the prediction unit passes a 1-D tensor associated with the Melspectrogram images through the flattening layer to the dense layer, and wherein the dropout layer between the two dense layers prevents the deep learning model from over fitting.

8. The system as claimed in claim 1, wherein the deep learning model is trained in a prediction unit of the identification engine with training datasets prior to identifying the subject, the training datasets are generated based on captured micro-vibrations associated with multiple subjects in a resting position and converting the captured micro-vibrations into the Melspectrogram image.

9. The system as claimed in claim 8, wherein the training datasets are pre-processed and inputted to the prediction unit of the identification engine along with labels for training the deep learning model, the labels used in training the deep learning model represent ground truth associated with each Melspectrogram image, and wherein the training datasets comprises input images associated with the multiple subjects, the input images are Melspectrogram images in a 4-D format with dimensions "batch_size, height, width, depth", such that the batch_size is a number of training datasets in one forward pass, height (H) is height of the image, width (W) is width of the image, and depth (D) is number of color channels of the image.

10. The system as claimed in claim 9, wherein the prediction unit trains the deep learning model by passing Melspectrogram images through the convolution layers and max pooling 2-D layers along with the respective labels, and wherein the batch_size of the output images remains same as that of the input Melspectrogram images and height, weight and depth of the output image changes based on number of filters, kernels and padding of the convolution layers.

11. The system as claimed in claim 10, wherein the filters of the convolution layer of the deep learning model comprises light color regions and dark color regions such that the light color region in the filter represents a value '1', and the dark color region in the filter represents a value '0'.

12. The system as claimed in claim 10, wherein the prediction unit passes the Melspectrogram image through the three convolution 2-D layers paired with three max pooling 2-D layers by providing the Melspectrogram image as an input to a first convolution layer and output of the first convolution layer is provided as an input to a first max pooling 2-D layer, the output of the first max pooling 2-D layer is provided as an input to a second convolution layer and output of the second convolution layer is provided as an input to a second max pooling 2-D layer, the output of the second max pooling 2-D layer is provided as an input to a third convolution layer and output of the third convolution layer is provided as an input to a third max pooling 2-D layer.

13. The system as claimed in claim 12, wherein the prediction unit passes the Melspectrogram image through the trained deep learning model for computing the identity of the subject by:
  pre-processing the Melspectrogram image associated with the subject to compute a Melspectrogram image of dimensions (None, 32, 32, 3), the dimension 'None' represents various numbers of images which are provided while training and "32, 32, and 3" represents height (H1), width (W1) and depth (D1) respectively of the Melspectrogram image;
  providing the computed Melspectrogram image as an input to the first convolution layer of the deep learning model to generate an output of dimension "None, 30, 30, 16" based on number of filters (K1) in the first convolution layer, strides (S), spatial extent of the filters (F) and padding (p), wherein the number of filters is 16, strides (S) is 1 and spatial extent of filters (F) is 3 with 0 padding (P);
  providing the output from the first convolution layer as an input to a first max pooling 2-D layer, the first max pooling 2-D layer uses a shape of dimensions (2, 2) for reducing dimensions of the output received from the first convolution layer to generate an output of a dimension "None, 15, 15, 16", wherein 'None' represents various numbers of images which are provided while training and "15, 15, 16" represents height, width and depth of the output;
  providing the output from the first max pooling 2-D layer as an input to the second convolution layer to generate an output of a dimension "None, 13, 13, 16", wherein 'None' represents various numbers of images which are provided while training and "13, 13, 16" represents height (H2), width (W2) and depth (D2) of the output;
  providing the output from the second convolution layer to as an input to a second max pooling 2-D layer to generate an output of a dimension "None, 6, 6, 16", wherein 'None' represents various numbers of images which are provided while training and "6, 6, 16" represents height, width and depth of the output;
  providing the output from the second max pooling 2-D layer to a third convolution layer to generate an output of a dimension "None, 4, 4, 16", wherein 'None' represents various numbers of images which are provided while training and "4, 4, 16" represents height (H3), width (W3) and depth (D3) of the output;
  providing the output from the third convolution layer as an input to a third max pooling 2-D layer to generate an output of a dimension "None, 2, 2, 16", wherein 'None' represents various numbers of images which are provided while training and "2, 2, 16" represents height, width and depth of the output;
  providing the output from the third max pooling 2-D layer as an input to a flattening layer to generate an output of a dimension "None, 64";

providing the output from the flattening layer as an input to a first dense layer to generate an output of a dimension "None, 256";

providing the output from the first dense layer as an input to a dropout layer to generate an output of a dimension "None, 256";

providing the output from the dropout layer as an input to a second dense layer to generate an output of a dimension "None, 20", wherein the value "20" represents number of the labels; and transforming the output from the second dense layer into a feature map using the convolution layer filters present in the convolution layer for obtaining the predicted labels, for identifying the subject, based on the labels used during training of the deep learning model.

14. The system as claimed in claim 13, wherein the output from the second dense layer is associated with the predicted labels used for identifying the subject, and wherein the predicted labels represent response of the trained deep learning model for classifying the Melspectrogram image associated with the subject.

15. The system as claimed in claim 13, wherein the prediction unit is configured to compute parameters based on the first convolution layer, the second convolution layer, the third convolution layer, the first dense layer and the second dense layer of the trained deep learning model, and wherein the parameters represent the number of learnable elements in a convolution layer, and wherein the number of parameters are computed based on the number of filters (K) used along with their kernel size (KZ), a bias and number of filters in the previous layer (D).

16. The system as claimed in claim 15, wherein the parameters are computed during the training of the deep learning model, prior to the implementation of the trained deep learning model.

17. The system as claimed in claim 13, wherein the prediction unit is configured to transmit identity data of the subject associated with the computed identity of the subject to a database in the identification engine for storage and future retrieval, and wherein a user device is configured to connect to the database for retrieving, accessing and viewing the subject's identity data via a Graphical User Interface (GUI) of an application in the user device or via a GUI rendered via a web portal.

18. The system as claimed in claim 1, wherein the system is configured to compute health data of the subject based on identity data associated with the identity of the subject, and wherein the health data of a non-intended subject captured and tagged intentionally or unintentionally along with the health data of the intended subject is removed based on the identity data of the identified subject, and wherein the health data captured from an intended subject and a non-intended subject is distinguished for preventing mixing of the health data of the intended subject and the non-intended subject.

19. The system as claimed in claim 1, wherein the system is configured to couple identity data associated with the identified subject with the subject's biometric data for providing double layer secure authentication, wherein the subject's biometric data comprises retina scan and fingerprints.

20. A method for efficiently identifying a subject, wherein the method is implemented by a processor executing instructions stored in a memory, the method comprises:

segmenting micro-voltage digital signals into intervals of a pre-defined time period;

transforming the segmented micro-voltage digital signals into a frequency domain for computing on a Mel's scale, wherein the Mel's scale provides a unique signature of the subject in the form of a Melspectrogram image; and passing the Melspectrogram image through a trained deep learning model, wherein features associated with the Melspectrogram image are extracted into a feature map for obtaining predicted labels associated with the subject based on labels used during training of the deep learning model for identifying the subject.

21. The method as claimed in claim 20, wherein the intervals of the pre-defined time period comprises ±10 seconds.

22. The method as claimed in claim 20, wherein the deep learning model is generated using neural networks associated with the deep learning techniques, and wherein the deep learning techniques comprises a Deep Neural Network (DNN), a Long Short Term Memory Network (LSTM) and a Convolutional Neural Network (CNN).

23. The method as claimed in claim 20, wherein one or more pre-defined number of neural network layers of the deep learning model are stacked together, through which the Melspectrogram image is passed, and wherein the pre-defined number of neural network layers of the deep learning model comprises three convolution 2-D layers paired with three max pooling 2-D layers respectively, two dense layers, a flattening layer between the two dense layer and a dropout layer.

24. The method as claimed in claim 23, wherein the three convolution 2-D layers paired with the max pooling 2-D layers are used for extracting features from the Melspectrogram images and subsequently carrying out downsampling, and wherein the features are associated with the subject.

25. The method as claimed in claim 20, wherein a 1-D tensor associated with the Melspectrogram images is passed through the flattening layer to the dense layer, and wherein the dropout layer between two dense layers prevents the deep learning model from over fitting.

26. The method as claimed in claim 20, wherein the deep learning model is trained with training datasets prior to identifying the subject, the training datasets are generated based on capturing the subject's micro-vibrations associated with the multiple subjects in a resting position and converting the captured micro-vibrations into the Melspectrogram image.

27. The method as claimed in claim 26, wherein the training datasets are pre-processed and inputted along with labels for training the deep learning model, the labels used in training of the deep learning model represent ground truth associated with every Melspectrogram image, and wherein the training datasets comprises input images associated with multiple subjects, the input images are Melspectrogram images in a 4-D format with dimensions "batch_size, height, width, depth", such that the batch_size is a number of training datasets in one forward pass; height (H) is height of the image; width (W) is width of the image; and depth (D) is number of color channels of the image.

28. The method as claimed in claim 24, wherein the Melspectrogram images are passed through the convolution layers and max pooling 2-D layers of the deep learning model along with the respective labels, and wherein the batch_size of the output image remains same as that of input Melspectrogram image and height, weight and depth of the output image changes based on number of filters, kernels and padding of the convolution layers.

29. The method as claimed in claim 23, wherein the Melspectrogram image is passed through the three convolution 2-D layers paired with three max pooling 2-D layers by providing the Melspectrogram image as an input to a first convolution layer and output of the first convolution layer is provided as an input to a first max pooling 2-D layer, the output of the first max pooling 2-D layer is provided as an input to a second convolution layer and output of the second convolution layer is provided as an input to a second max pooling 2-D layer, the output of the second max pooling 2-D layer is provided as an input to a third convolution layer and output of the third convolution layer is provided as an input to a third max pooling 2-D layer.

30. The method as claimed in claim 29, wherein the Melspectrogram image is passed through the trained deep learning model for computing the identity of the subject by:
  pre-processing the Melspectrogram image associated with the subject to compute a Melspectrogram image of dimensions (None, 32, 32, 3), the dimension 'None' represents various numbers of images which are provided while training and "32, 32, and 3" represents height (H1), width (W1) and depth (D1) respectively of the Melspectrogram image;
  providing the generated Melspectrogram image as an input to the first convolution layer of the deep learning model to generate an output image of dimension "None, 30, 30, 16" based on number of filters (K1) in the first convolution layer, strides (S), spatial extent of the filters (F) and padding (p), wherein the number of filters is 16, strides (S) is 1 and spatial extent of filters (F) is 3 with 0 padding (P);
  providing the output from the first convolution layer as an input to a first max pooling 2-D layer, the first max pooling 2-D layer uses a shape of dimensions (2, 2) for reducing dimensions of the output image received from the first convolution layer to generate an output of a dimension "None, 15, 15, 16", wherein 'None' represents various numbers of images which are provided while training and "15, 15, 16" represents height, width and depth of the output;
  providing the output from the first max pooling 2-D layer as an input to the second convolution layer to generate an output of a dimension "None, 13, 13, 16", wherein 'None' represents various numbers of images which are provided while training and "13, 13, 16" represents height (H2), width (W2) and depth (D2) of the output image;
  providing the output from the second convolution layer to as an input to a second max pooling 2-D layer to generate an output of a dimension "None, 6, 6, 16", wherein 'None' represents various numbers of images which are provided while training and "6, 6, 16" represents height, width and depth of the output;
  providing the output from the second max pooling 2-D layer to a third convolution layer to generate an output of a dimension "None, 4, 4, 16", wherein 'None' represents various numbers of images which are provided while training and "4, 4, 16" represents height (H3), width (W3) and depth (D3) of the output;
  providing the output from the third convolution layer as an input to a third max pooling 2-D layer as an input to generate an output of a dimension "None, 2, 2, 16", wherein 'None' represents various numbers of images which are provided while training and "2, 2, 16" represents height, width and depth of the output;
  providing the output from the third max pooling 2-D layer as an input to a flattening layer to generate an output of a dimension "None, 64";
  providing the output from the flattening layer as an input to a first dense layer to generate an output of a dimension "None, 256";
  providing the output from the first dense layer as an input image to a dropout layer to generate an output of a dimension "None, 256";
  providing the output from the dropout layer as an input to a second dense layer to generate an output of a dimension "None, 20", wherein the value "20" represents number of labels; and
  transforming the output from the second dense layer into a feature map using the convolution layer filters present in the convolution layer for obtaining the predicted labels, for identifying the subject, based on the labels used during training of the deep learning model.

31. The method as claimed in claim 30, wherein the output from the second dense layer is associated with the predicted labels used for identifying the subject, and wherein the predicted labels represent response of the trained deep learning model for classifying the Melspectrogram image associated with the subject.

32. A computer program product comprising:
  a non-transitory computer-readable medium having computer program code stored thereon, the computer-readable program code comprising instructions that, when executed by a processor, causes the processor to:
    segment micro-voltage digital signals into intervals of a pre-defined time period;
    transform the segmented micro-voltage digital signals into a frequency domain for computing on a Mel's scale, wherein the Mel's scale provides a unique signature of the subject in the form of a Melspectrogram image; and
    pass the Melspectrogram image through a trained deep learning model, wherein features associated with the Melspectrogram image are extracted into a feature map for obtaining predicted labels associated with the subject based on labels used during training of the deep learning model for identifying the subject.

* * * * *